Nov. 3, 1959     J. H. COOPER     2,911,515
NARROW LAP SEAM WELDER Filed Oct. 16. 1956     5 Sheets-Sheet 1

INVENTOR

JOSEPH H. COOPER

Nov. 3, 1959      J. H. COOPER      2,911,515

NARROW LAP SEAM WELDER

Filed Oct. 16, 1956      5 Sheets-Sheet 2

Fig. 3

INVENTOR

JOSEPH H. COOPER

Nov. 3, 1959 J. H. COOPER 2,911,515
NARROW LAP SEAM WELDER
Filed Oct. 16, 1956 5 Sheets-Sheet 3

INVENTOR
JOSEPH H. COOPER

INVENTOR
JOSEPH H. COOPER

Nov. 3, 1959 J. H. COOPER 2,911,515
NARROW LAP SEAM WELDER
Filed Oct. 16, 1956
5 Sheets-Sheet 5

INVENTOR
JOSEPH H. COOPER

United States Patent Office 2,911,515
Patented Nov. 3, 1959

2,911,515

NARROW LAP SEAM WELDER

Joseph H. Cooper, Warren, Ohio, assignor to The Taylor-Winfield Corporation, Warren, Ohio, a corporation of Ohio Application October 16, 1956, Serial No. 616,151

25 Claims. (Cl. 219—79)

The present invention relates generally to electric resistance welding apparatus and more particularly to an improved narrow lap seam welder for joining the ends of metal strips or sheets in end-to-end relation thereby forming a continuous metal strip.

In continuous process lines for the working of metal strip, such as electroplating lines, for example, it is desirable to incorporate welding apparatus for joining the successive ends of coils of metal strip in order that the various components of the line do not have to be stopped and threaded with a new strip each time a coil is exhausted. Due to advances in other arts, the speeds of such continuous process lines have been continuously advanced and it has been necessary to develop welding equipment and apparatus which is operative to join the ends of metal strips in a fast and expedient manner. As will be appreciated, the faster the welding operations are completed the less appurtenant strip storage material is required and the speed of the strip in the process line may be maintained at a higher overall rate.

Certain pieces of equipment in process lines of the general type indicated above are sensitive to the thickness of the strip passing therethrough and it is therefore necessary that the welded seams in the strip be as thin as possible. As an example, roller levellers and other apparatus embodying spring mounted rolls will be deflected by a thick welded seam and the "recovery rate" or mechanical response of such apparatus may be so slow as to render long lengths of strip adjacent the welded seam completely unacceptable. This problem has been accentuated by increases in the speed of the strip moving through such process lines as is readily apparent.

To alleviate the problem of the thickness of the welded seams it has heretofore been proposed to weld the ends of strips or sheets by slightly overlapping the ends and traversing the resulting overlap with opposed welding electrodes operative to both weld and mash or compress the ends together. In this manner the thickness of the welded seam may be of less thickness than the aggregate thickness of the two ends of strip or sheet being welded. Such welding is usually referred to as "semi-mash" or "narrow lap" type of seam welding in the art.

In narrow lap seam welding it is of the utmost importance that the overlap of the end of the strips or sheets be very accurately controlled since this is the main controlling factor in producing acceptable welds. The magnitude of the welding current and the mashing pressure is dependent upon the amount of overlap and a slight variation in the overlap across the width of the strips of sheets being joined will usually result in an unacceptable final product. Since the overlap is very slight, problems which have been encountered in providing narrow lap seam welding apparatus which is operative to accurately and precisely regulate the overlapping of the ends of the strips, especially on strips of exceptionally large width dimension.

It is accordingly the primary object of the invention to provide an improved semi-mash seam welder which is operative to very accurately and precisely control the overlapping of the ends of the strips to be welded.

Another object of the invention is to provide a welder of the type indicated adapted to weld ends of metal strips and sheets in a fast and expeditious manner thereby being exceptionally well adapted for use in continuous process lines and other like installations.

A more specific object of the present invention is to provide improved shearing and gauging means for initially preparing the ends to be welded. As will be more readily apparent, the shearing and gauging means are mounted on retractable carriages but are operable independently of the vertical movement of these carriages.

A further object of the invention is to provide new and novel means for relieving the actuating means for the shearing and gauging carriages from shock forces resulting from the shearing and gauging operations. In this manner these actuating means may be of much smaller size than usually required in like apparatus and the shears and gauge bar are retained in proper vertical position.

Yet another object of the invention is to provide apparatus for accurately controlling the overlap of the ends to be welded. Clamps are utilized to clamp the ends after shearing and gauging and means are provided for moving the clamps both vertically and horizontally to effect the overlap while the ends are still clamped.

Another object of the invention is to provide means for adjustably limiting the amount of overlap of the ends of the strips or sheets to be welded.

An ancillary object of the invention is to provide apparatus of the type contemplated which is characterized by its simplicity in structure and operation.

These, as well as other objects of the invention, will become more readily apparent upon consideration of the following specification and accompanying drawing wherein there is shown and described a preferred embodiment of my improved narrow lap seam welder.

In the drawing:

Fig. 1 is a fragmentary side view of the clamping and positioning assembly taken along the section line VII—VII of Figure 6;

Figure 1:
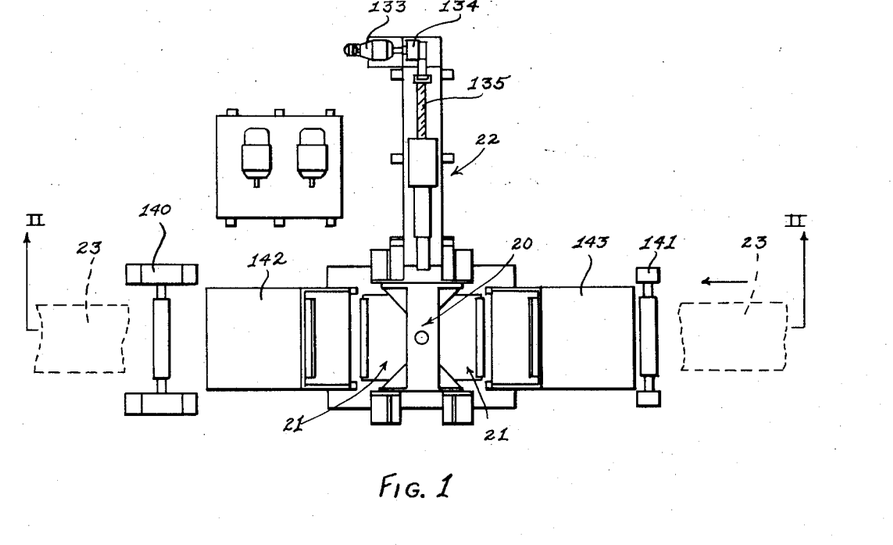
Figure 1 is a plan elevation of semi-mash or narrow lap welding apparatus constructed in accordance with the teachings of the present invention.
Figure 2:
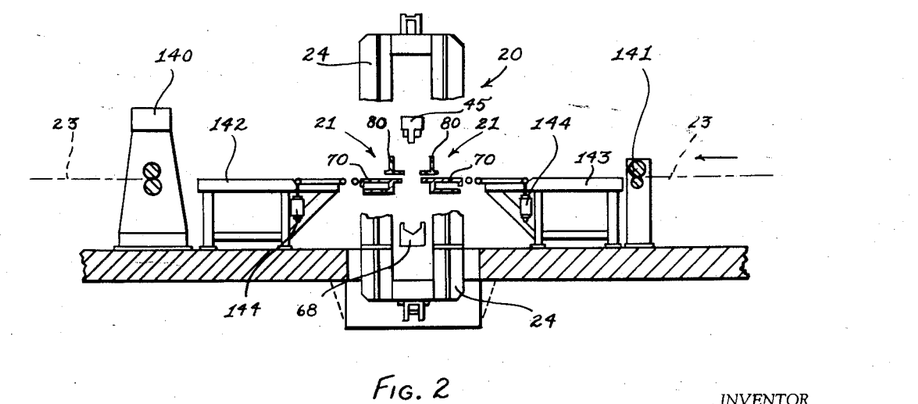
Figure 2 is a fragmentary side view taken along the section line II—II of Figure 1.

Referring now to the drawing, and initially to Figures 1 and 2 thereof, the improved seam welding apparatus of the present invention is shown to comprise a shearing and gauging assembly 20 for preparing the ends of the strips for overlapping, a pair of clamping and overlapping assemblies 21 disposed on opposite sides of and closely adjacent to the shearing and gauging assembly 20 and adapted to properly position the ends of the strips and a welder assembly 22 for traversing the overlapped strip ends to complete the weld. The numeral 23 represents a path of strip travel through the apparatus of the present invention with the arrows designating the usual direction of strip travel.

The general functioning of the above assemblies is such that the strip ends are gauged, clamped, sheared, moved to overlapping relation and then traversed by the welder assembly. For those desiring a comprehensive knowledge of the general method and apparatus employed, as well as information concerning the patent protection thereon, reference is made to my two co-pending patent applications, Serial Nos. 528,202 and 537,222, which were filed August 15, 1955, and September 28, 1955, respectively, and are assigned to the assignee of the present invention. The various assemblies utilized in the apparatus of this invention, as well as a preferred method of operation, will be more fully explained in the following specification.

Shearing and gauging assembly

Figure 3:
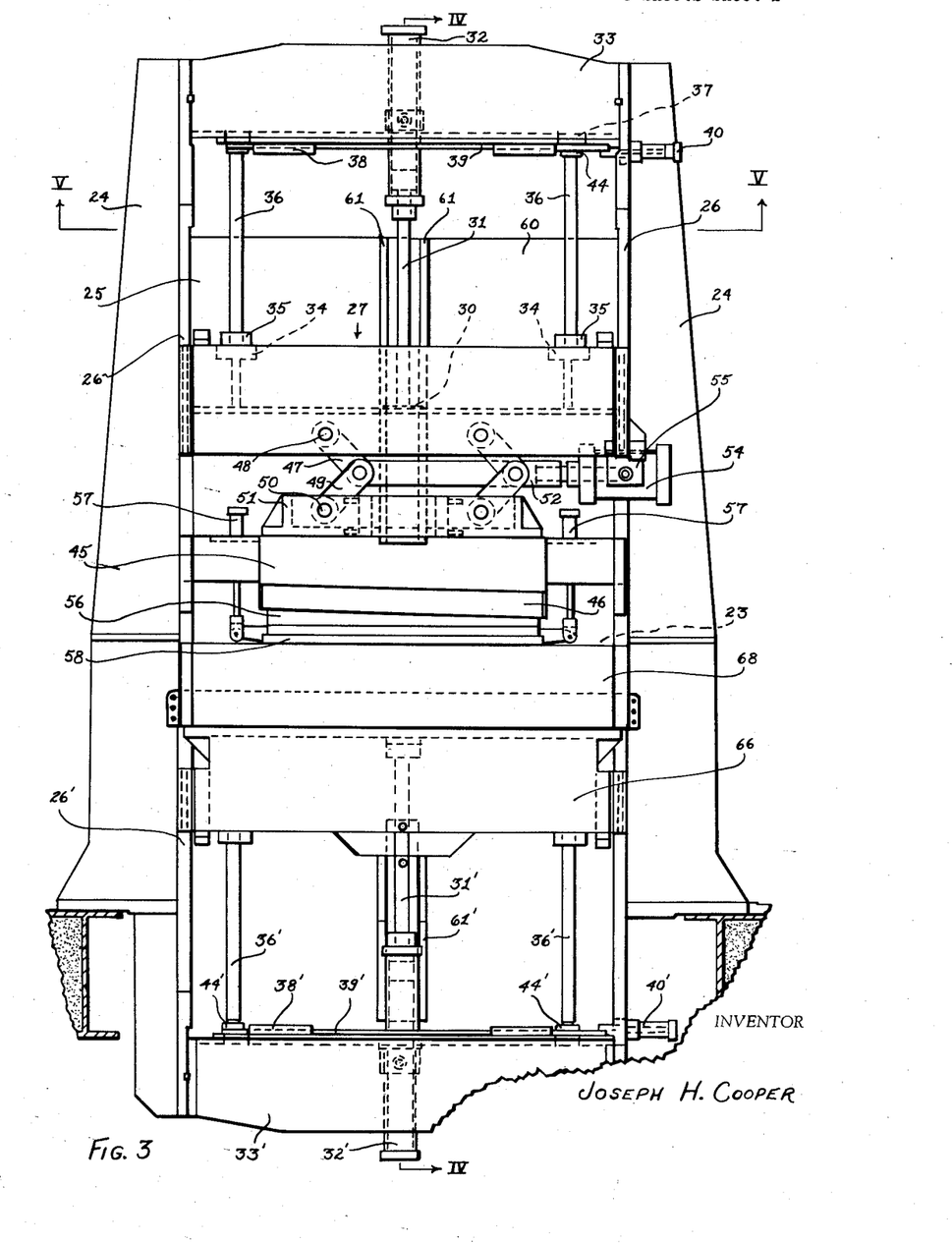
Figure 3 is an enlarged end view illustrating my new and novel strip gauging and clamping assembly as incorporated in the apparatus of Figure 1.
Figure 4:
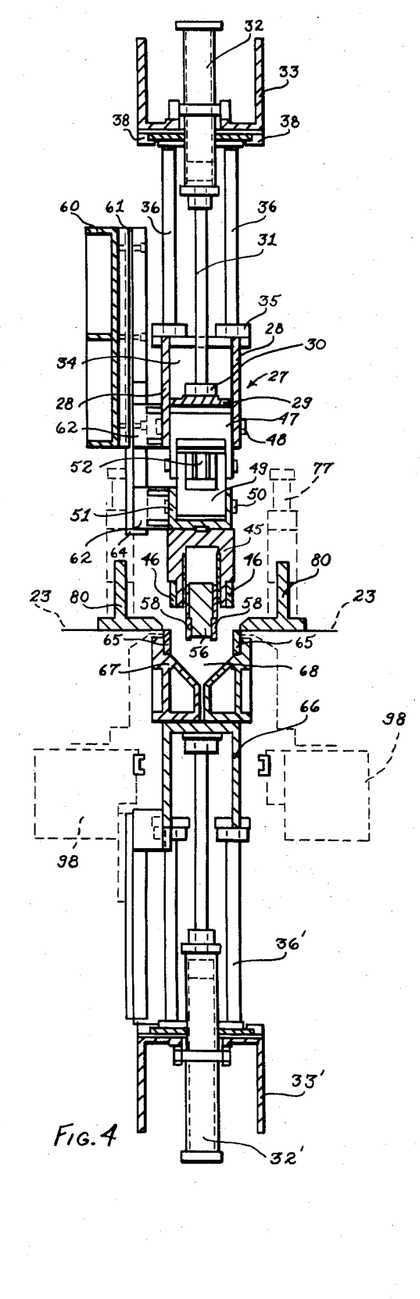
Figure 4 is a side sectional view taken along the section line IV—IV of Figure 3.
Figure 5:
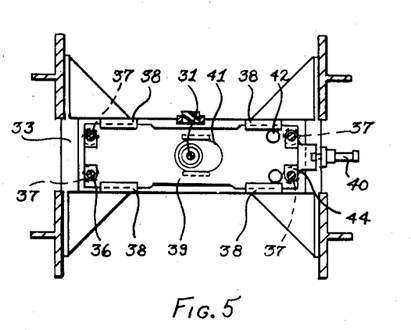
Figure 5 is a sectional plan view as seen from the section line V—V of Figure 3.
Figure 6:
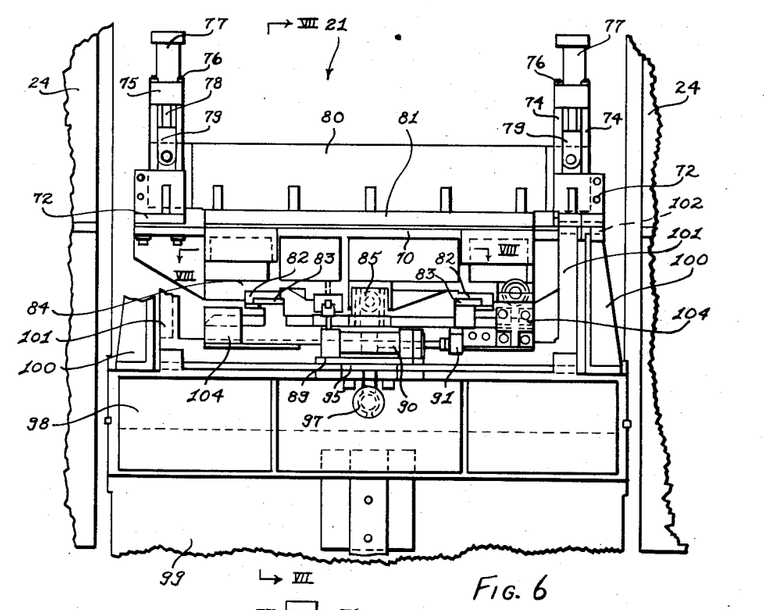
Figure 6 is an end view of the new and novel clamping and positioning assembly forming an integral part of the narrow lap seam welder shown in Figure 1.

Considering first the shearing and gauging assembly, which is perhaps best shown in Figures 3–5 of the drawing, a large housing 24 having a rectangular window 25 therein is disposed transversely to and in spanning relation with the path of strip travel 23. The inner edges of the window 25 above the pass line 23 are fixed with various members which define slides or ways 26 that guide the side edges of a vertically movable upper carriage 27. As evidenced in Figure 4 the carriage 27 comprises a pair of spaced plates 28 extending across the path of strip travel 23 which are joined by a connecting web 29 intermediate their ends. An apertured and internally threaded boss 30 is positioned on the top face of the web 29 to receive the end of a piston rod 31 of a fluid cylinder 32 pivotally attached and protruding through a spanning upper support 33 of the housing 24. The opposite ends of the spaced plates 28 are separated by the webs 34, each of which is provided with a pair of spaced mounting bosses 35 adapted to rigidly hold the ends of guiding rods 36. As is readily apparent, a total of four guiding rods are attached to the upper carriage 27. The upper support 33 of the housing 24 has suitable spaced apertures 37 which, under certain conditions, allow the guiding rods 36 to pass therethrough when the upper carriage is retracted.

The upper support 33 also mounts four downwardly directed channels 38 forming slides for a transversely movable upper shear locking plate 39. The plate 39 is movable by means of a small fluid cylinder 40 having its piston rod connected thereto and mounted on the housing 24. The upper shear locking plate has an elongated aperture 41 therein to allow movement without interference from fluid cylinder 32 and is provided with a pair of apertures 42 adapted to coincide at certain times with the corresponding apertures 37 in the upper support 33. Mounted on the shear locking plate 39 near the corners thereof are blocks 44 which form abutment surfaces for the ends of guiding rods 36 when the upper carriage is in the down position and the upper locking plate is in the position shown. This arrangement prohibits undesirable movement of upper carriage and prevents excessive shock loads from being transmitted to the cylinder 32.

Suspended from the upper carriage 27 in depending relation by a pair of toggle linkages is an upper shear carrier 45 which extends across the path of strip travel and is guided for vertical movement by extending projections riding in the slides 26. Bolted to the opposite side faces of the shear carrier are raked shear blades 46 which are at least as long as the width of the strip ends to be welded. Each of the toggle linkages comprises a first downwardly depending U-shaped link 47 pivoted to the upper carriage 27 by a pivot pin 48 and a second U-shaped link 49 pivotally attached by pin 50 to a generally U-shaped member 51. The links 47 and 49 are interconnected by a pivot pin and an operating rod 52 joins both of the toggle linkages with a fluid cylinder 54 mounted from a clevis 55 near one end of the upper carriage 27. In this manner of construction the raked shear blades 46 are vertically movable independently of the upper shear carriage 27 upon proper actuation of the fluid cylinder 54. It is noted that such an arrangement allows the utilization of raked shear blades for cropping the ends of the strips to be welded which are superior to straight blades since they can be of much smaller physical size for the same shearing operation. The upper shear carrier 45 is, of course, rigidly secured by a key and bolts to the U-shaped member 51 so that the upper shear carrier and the upper carriage are both movable upon actuation of the fluid cylinder 32.

It will be noted in Figure 4 of the drawing that the shear carrier 45 is generally U-shaped in cross section and mounted in the opening defined by the legs thereof is the gauging means of the present invention. This comprises a gauge bar 56 which is attached by clevises on both ends thereof to the piston rods of fluid cylinders 57 mounted on opposite ends of the upper shear carrier 45. The gauge bar 56 is provided with accurately ground and prepared gauging faces 58 which form an abutment for the ends of the strips on both sides and further includes vertical slides, not specifically shown, cooperating with vertical ways in the U-shaped shear carrier 45 so that the bar 56 is accurately guided for vertical movement. It is noted that the gauge bar and surfaces are adapted to be retracted up into the shear carrier 45 when not in use thereby providing compact and nesting arrangement.

To further control and guide the various vertical assemblies one side of the window 25 is partially closed by a plate 60 which has channels 61 bolted thereto to define a way. The U-shaped member 51 and the upper shear carriage 27 have generally T-shaped projections 62 adapted to ride in this way. As shown in Figure 4 of the drawing the channels 61 may be provided with stops 64 for limiting the downward movement of the shears and gauging bar.

It is, of course, necessary to provide cooperating shear blades for the raked upper shear blades 46 and much of the mechanism supporting lower shear blades 65 is the same as the apparatus employed with the upper shear blades. To avoid repetition in the description of the apparatus, all parts relating to the lower shear blade assembly which are identical to those described previously, are designated by primed numerals and only those portions of the apparatus which are different will be described in detail. A lower carriage member 66 of generally U-shaped cross section is adapted to be vertically reciprocated by the cylinder 32'. Lower shear carriers 67 are mounted on the top face of the carriage 66 and are shaped to define a generally triangular opening 68 near the top thereof so that the upper and lower shear carriers and gauging plates will not interfere with each other during the operation of the apparatus. It will be observed that in all Figures 3 and 4 the shear carriages are shown in their most extended positions, the upper shears 46 in relatively retracted position, the lower shears 65 in shearing position and the gauging bar 56 in the gauging position. The locking plates 39 and 39' are also shown in a position which prohibits upward movement of the carriage 27 and downward movement of the carriage 66. As will be appreciated the shears and gauging bar and plates must be retracted out of the way before the weld can be completed since in the position shown the various apparatus blocks the movement of the welding assembly 22. A preferred sequence of operation and means for completing it will be disclosed later in the specification.

Clamping and overlapping assemblies

Considering now the specific construction of the clamping and overlapping assemblies 21 employed in the narrow lap seam welder of the present invention, there are provided identical assemblies on opposite sides of the gauging and shearing assembly 20. In the interest of brevity only one of these assemblies will be described in detail but, as will be apparent upon inspection of Figures 2 and 7, like component parts are provided for each assembly.

Each of the clamping and overlapping assemblies comprises a platen 70 of generally hollow rectangular cross section which has a channel-like member 71 attached to the forward edge thereof by bolts or other equivalent attachment means. These members extend transversely across the path of strip travel and form a table-like support for the strip ends to be welded as well as a lower clamping member. On each end of the platen 70 out of interfering relation with respect to the strips to be welded are a pair of mounting brackets 72, each of which is formed with an opening 73 in its upstanding leg portion and rigidly receives the ends of four upstanding rods 74. A rectangular cap fitting 75 is rigidly held between shouldered portions of these rods and capping nuts 76 to provide a mounting surface for a fluid cylinder 77. The cap fitting 75 is apertured so that piston rod 78 may extend therethrough, said piston rod mounting a clevis fitting 79 to form a pivotal connection with one end of an upper clamping member 80. It is noted that the rods 74 and the openings 73 in the two mounting brackets 72 effectively form guides for guiding the vertical movement of the upper clamping member 80 and the clevis fittings 79.

Figure 7:
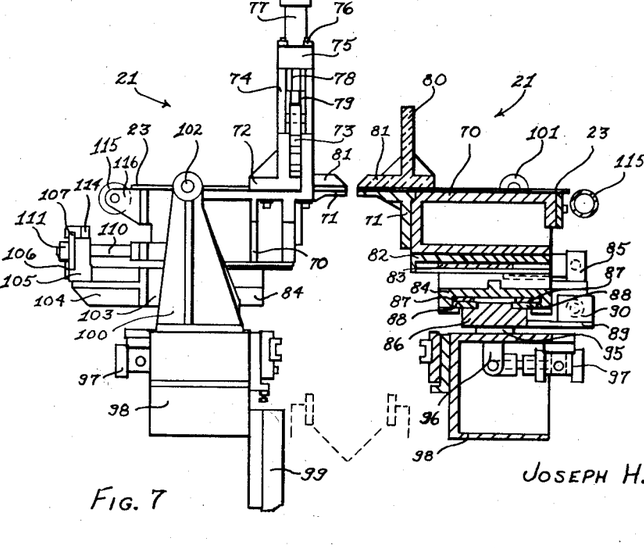
Figure 8:
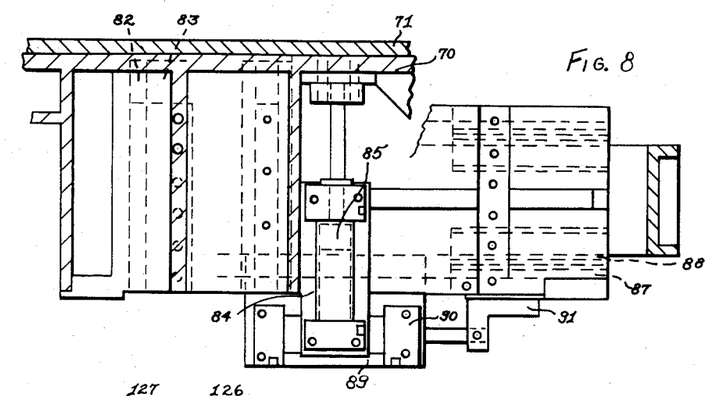
Figure 8 is a sectional view taken along the section line VIII—VIII of Figure 6.

The clamping member 80 has a projecting foot portion 81 and extends transversely across the path of strip travel 23. It should be apparent that upon proper actuation of the fluid cylinders 77 that the upper clamping member may be moved to such a position, as shown in Figure 7, whereby a strip end to be welded is tightly clamped between the platen 70 and the channel member 71 and the projecting foot portion 81. It is noted that the upper clamping member 80 can be actuated independently of any movement in the platen 70 or channel 71 for reasons which will be hereinafter more fully apparent.

Since, in the intended operation of the apparatus, it is necessary to provide means for overlapping the strip ends after the same have been clamped I contemplate that the platen 70 and upper clamping member 80 will be vertically, longitudinally and transversely movable to insure proper overlap. This is accomplished in the present instance by attaching wear resistant inturned channels 82 at spaced points on the bottom face of the platen 70 which are adapted to cooperate with wear resistant plates 83 attached to the top face of an intermediate supporting member 84 having the shape and configuration shown in the various views of the drawing. Extending from and rigidly attached to the intermediate supporting member 84 is a clamp slide fluid cylinder 85 which has its piston rod operatively coupled with the platen 70 in order that upon proper actuation of the clamp slide cylinder 85 the platen 70 and other appurtenant equipment carried thereby are slidable longitudinally with respect to the intermediate supporting member 84. In effect, the wear resistant channels and plates, 82 and 83 respectively, form cooperating slides for accurately guiding the movement of the platen 70.

The intermediate supporting member 84 is supported from a T-shaped block 86 by means of transversely extending wear resistant plates 87 and 88 which form sliding contact surfaces. An extending frame 89 is attached to the T-shaped block and mounts a cross slide cylinder 90 which has its piston rod rigidly secured to an angle 91 mounted on the intermediate supporting member 84. In this manner of construction the intermediate supporting member 84, as well as the platen 70 and other apparatus carried thereby, is movable transversely to the line of trip travel. This arrangement is utilized to allow accurate cross alignment of the strip ends to be welded irrespective of the relative longitudinal and clamped position of the strip ends.

Before the sheets can be overlapped it is necessary that one of the strip ends be offset from the plane of the other so that there is no interference when the strip ends are moved toward each other. To accomplish this a pad 95 is attached to the bottom face of the T-shaped block having a downwardly depending clevis 96 which is pivotally connected to the piston rod of a fluid pivot cylinder 97. The pivot cylinder 97 is mounted on a stationary housing 98 that is apertured and recessed to receive the clevis 96 and the pad 95. Upon actuation of the pivot cylinder 97 the entire clamping and overlapping assembly 21 is caused to be moved in an upwardly direction thereby raising the platen 70 and the upper clamping member 80 above the general path of strip travel. When the platen 70 is in the down position the pad 95 rests on the top face of the housing 98 whereby the load is removed from the cylinder 97 and an accurate alignment of the platen 70 and the normal path of strip travel is afforded. As shown, the housing 98 is supported from a frame 99 a proper distance above the floor level or base of the plant, for example.

In order to control the pivotal movement of the clamping and overlapping assembly a pair of upwardly extending brackets 100 are bolted to opposite ends of the housing 98 and the T-shaped block 86 is provided with upwardly extending arms 101. Both the arms 101 and the brackets 100 have bosses formed on the upper extremities thereof to receive the pivot pins 102. It is noted that these bosses are at substantially the same heighth as the normal path of strip travel. Since the brackets are mounted on the stationary housing 98 the entire clamping and overlapping assembly will pivot about the pins 102 upon actuation of the pivot cylinder 97.

As has been indicated in the previous discussion, it is essential that the amount of overlap be accurately controlled if an ecceptable welded seam is to result. In my present apparatus the amount of overlap may be adjustably limited so that different thicknesses of strip ends can be welded. A pair of spaced vertically extending mounting plates 103 are provided on opposite ends of the intermediate supporting member 84 to which are bolted longitudinally extending brackets 104. These brackets form supports for apertured blocks 105 mounted on the outer ends thereof and retaining plates 106. Also extending from and rigidly secured to the rear end portion of the platen 70 are a pair of rods 110 that extend through and are movable with respect to the blocks 105. The outer ends of the rods 110 are threaded to receive the large limiting nuts 111.

Figure 9:
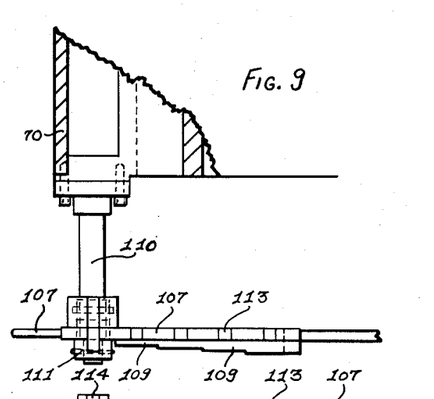
Figures 9, 10 and 11, are plan, fragmentary and end views, respectively, of the mechanism employed for adjustably limiting the overlap of the end of the metal strips or sheets to be welded.
Figure 10:
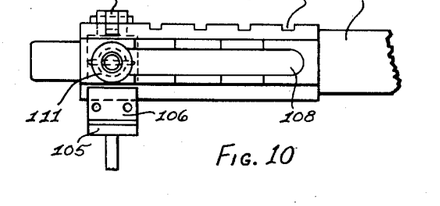
Figure 11:
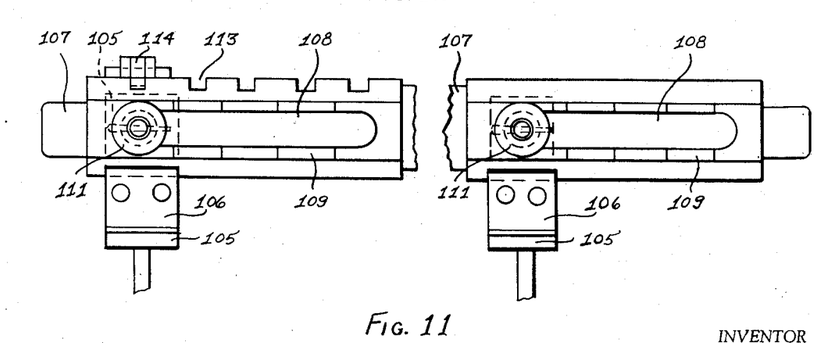

Spanning the rods 110 and held in rigid relation with respect to the blocks 105 by means to be hereinafter more fully described is an elongated stopping member 107 having the ends thereof accurately machined in a series of steps to form abutment surfaces 109. In Figures 9, 10 and 11 of the drawing, there is shown this structure as applied to the clamping and overlapping assembly and it will be understood that the other assembly of the apparatus is of the same construction. Each of the ends of the stopping member 107 is formed with an elongated aperture 108 so that this member may be moved transversely with respect to the rod 110 and brackets 104. The upper edge of one end of the stopping member 107 is formed with a plurality of slots 113 which are adapted to be engaged by a hook-like lever 114 pivotally mounted on one of the blocks 105.

The utilization of the above apparatus will at once be apparent when it is remembered that the rods 110 are attached to and movable with the platen 70 while the stopping member 107 is mounted from the brackets 105 which extend from the intermediate supporting member 84 which is not movable in the direction of strip travel. Thus, the forward movement of the platen 70 and the strip end clamped thereby is stopped when the limiting nuts 111 seat against the desired abutment surfaces 109 of the stopping member 107. To change the amount of overlap the hook-like lever 114 is raised and the stopping member 107 drawn to the right until the correct abutment surfaces 109 are in proper position. The lever 114 is then returned to the proper slot 113 so that the stopping member 107 is firmly retained in the desired position. The effect of this is to prevent the platen 70 from moving as far forward as in the previous instance. This means of adjustably limiting the amount of overlap is especially advantageous in that changes may be effected in a fast and expedient manner with great accuracy and precision by unskilled personel.

The clamping and overlapping assemblies further comprise a roller 115 mounted on the rear end of the platen 70 by brackets 116. This roller extends across the path of strip travel and is preferably journaled for rotation on a rod extending between these brackets.

As previously intimated, there are provided two identical overlapping and clamping assemblies, one on each side of the shearing and gauging assembly and closely adjacent thereto. Each of these overlapping and clamping assemblies is identical to the assembly disclosed above.

Welding and other assemblies

Figure 12:
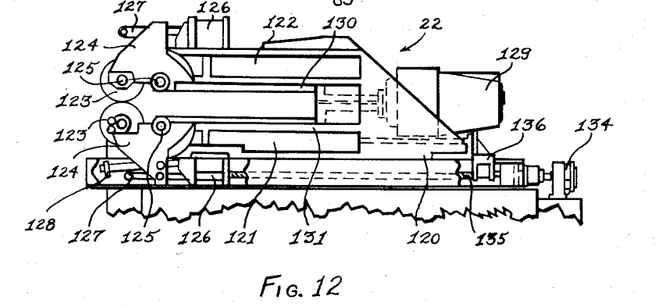
Figure 12 is a side view showing the welder assembly embodied in the narrow lap seam welder of Figure 1.

Referring now to Figure 12 of the drawing, the welding assembly 22 is shown to comprise a base portion 120 which supports at its forward end a lower horizontally extending electrode mounting arm 121. Secured in rigid relation to the lower arm 121 is an upper arm 122 which is disposed in generally parallel relation above the latter arm to define a horizontally forwardly opening recess.

At the forward extremity of each of the electrode mounting arms 121 and 122 is mounted an electrode assembly comprising an electrode wheel 123 and a journal bracket 124, the latter being pivotally secured by bearing members 125 to the mounting arms 121 and 122. On each of the mounting arms 121 and 122 there is mounted an electrode actuating cylinder 126 whose piston rod extends through the journal bracket 124 by way of connecting link 127. The links 127 form an interconnection between the linearly movable piston rods of cylinders 126 and the arcuately movable journal brackets 124 so that when either or both of the cylinders are actuated the electrode wheels 123 are caused to move toward or away from the strip pass line 23. As will be observed, the lower electrode wheel assembly is provided with adjustable movement limiting means 128 to adjustably restrict the movement of the lower electrode assembly.

Mounted on the outer end portion of the base portion 120 is a heavy duty electrical transformer 129. The secondary terminals of this transformer face in a forwardly direction and are connected with heavy current carrying conductors 130 and 131. These conductors extend along the inward edge of the electrode mounting arms 121 and 122 and are electrically connected to the current conductive bearings 125. Suitable electrical insulating material is provided so that the flow of current is limited to conductors 130 and 131, the conductor bearings 125, journal brackets 124 and the electrode wheels 123.

In the performance of a welding operation the ends of successive metal strips are positioned in slightly overlapping relation along a transverse plane defined by the welding electrodes 123 and the welding electrodes are moved across the overlap. Welding current and pressure are supplied and exerted through the welding electrodes 123 to heat, fuse and flatten the overlapped strip ends.

To draw the welder assembly through its traverse there is provided a reversible drive motor 133 which operates through a clutch and transmission mechanism 134 to drive an elongated threaded shaft 135 having driving engagement with the welder assembly 22 by means of threaded bearing 136.

In addition to the equipment described above various ancillary assemblies are provided which are necessary for the proper functioning of the narrow lap seam welding apparatus. As shown in Figures 1 and 2 of the drawing a pair of reversible pinch roll stands 140 and 141 are positioned on the opposite sides of the apparatus for moving the strips therethrough. Also positioned on both sides of the apparatus and inwardly of the pinch roll stands 140 and 141 are identical looper tables 142 and 143 each having a large flat upper surface for supporting the metal strips or sheets. A portion of each of these table surfaces may be pivoted upwardly by looper cylinders 144 whose function it is to provide sufficient slack in the strips so that the ends thereof may be easily and readily moved into overlapping relation.

Operation

For a complete description of an operational cycle of the narow lap seam welder it will be assumed that initially the shear carriages 45 and 66 are in their most retracted positions, that the platens 70 are level with the line of strip travel and the clamping members 80 are in the raised position and that the welder assembly 22 is disposed on one side of the housing 24 as shown in Figure 1 of the drawing. As will be understood by those skilled in this particular art various electrical and fluid operating circuits are provided for properly controlling the operation of the seam welder. Such circuits, which are not shown herein, may comprise conventional valves, limit switches etc., arranged in an appropriate manner to facilitate the completion of the welding operation. In addition, there would be provided a power control circuit for regulating and controlling the flow of welding current to the welding electrodes 123. Any type of power circuit suitable for regulating the welding current may be used.

When it is desired to initiate a welding operation the operator energizes control means, not shown, so that fluid is supplied to the top end of cylinder 32 thereby causing the upper shear carriage 27 and the upper shear carrier 45 to be lowered into the position shown in Figure 4 of the drawing. When the upper shear carriage and shear carrier reach their most downward position the locking cylinder 40 is automatically operated to move the locking plate 39 whereby the guiding rods 36 prohibit upward movement of the upper shearing mechanism. At this point in the operational cycle the gauge bar 65 is in the up position, the clamps are open, both vertically and horizontally, the pivot cylinders 97 are deenergized, and the movable portions of the looper tables are aligned with the path of strip travel.

The trailing end of a first strip, which may have been previously cropped by an external shear, not shown, is moved past the center of the apparatus by means of the pinch roll stands 140. Fluid is now supplied to the upper ends of the cylinders 57 so that the gauge bar is lowered into gauging position and obstructing relation with respect to the pass line of the strip. The pinch roll stand 140 is then reversed so that the edge of the trailing end of the first strip is caused to abut against one of the gauging plates 66 carried by the gauge bar 65. At this time the cylinders 77 of the clamping and overlapping assembly 21 on the left side of the narrow lap seam welding apparatus are appropriately actuated to lower the clamping member 80 thereby causing the first strip to be firmly clamped between the platen 70 and the projecting foot-like portion 81 of the upper clamping member 80. Simultaneously with the actuation of the upper clamping member 80 the looper cylinder 144 associated with the looper table 142 is energized to throw a loop in the trailing end of the first strip.

The lower shear carrier 66 is next moved into shearing position by fluid cylinder 32' and the locking plate 39' is actuated to block return movement of the same. This is shown in Figures 3 and 4 of the drawing.

The leading end of a second strip, which may have been cropped by an external shear, not shown, is next advanced by the pinch roll stand 141 into abutting relation with the other plate 58 on the gauge bar 56 and the clamping member 80 on the right hand side of the apparatus is lowered by the cylinders 77 associated therewith to clamp this leading end of the second strip. At the same time the other looper cylinder 144 is energized to throw a loop in the second strip. At this point in the operation of the apparatus it will be noted that both the leading and trailing or the first and second strips are tightly clamped with the edges thereof abutting the gauge bar 56.

An appropriate manual function is performed, such as depressing a push button, for example, which actuates the shearing cylinder 54 to longitudinally displace the operating lever 52 thereby causing a straightening of the toggle linkages 47—50 and moving the shear blades 46 into shearing engagement with the lower shear blades 65. Since the upper shear blades 46 are raked the ends of the strips will be severed near one side edge first with the fracture being perpetrated across the width of the strip ends as the upper shear carrier 45 nears the bottom of its stroke. As will be apparent to those skilled in the art, the use of raked shear blades allows conservation of materials in building the shearing and gauging assembly since this assembly does not need to be of such heavy and rugged construction as would be required if straight shear blades were utilized. Any shock forces resulting from the shearing operation are transmitted to the locking plates 39 and 39' via the guiding rod 36 and 36' so that the upper shear carriage 26 and the lower shear carrier 66 are always in the correct position and the cylinders 32 and 32' are relieved of shock forces. At the end of the shearing stroke the cylinder 54 is actuated in the opposite direction whereby the upper shear carrier 45 reverses its motion and moves to its retracted position.

It is now necessary to retract the shearing and gauging apparatus before further operations can proceed. This is accomplished by withdrawing the locking plates 39 and 39' and energizing the cylinders 32 and 32' so that the upper and lower shear carriers 45 and 66 are raised and lowered, respectively. The ends of the leading and trailing strips are still firmly clamped and have been both gauged and sheared and are thus ready for overlapping.

The operator then energizes one of the cylinders 97 to raise one of the strip ends above the path of strip travel. If there is a difference in the thickness of the strips it is preferable that the thinner strip will be moved out of the plane of the path of strip travel. For the purpose of illustration it will be assumed that the cylinder 97 on the right hand side of the apparatus is actuated to raise the leading end of the second strip. The strips are now adapted to be moved into overlapped relation since the ends of the same are offset from each other.

To cause the overlap of the ends of the leading and trailing strips both of the clamp slide cylinders 85 are simultaneously actuated thereby moving the platens 70 and the upper clamping members 80 with the strip ends clamped therebetween toward each other. This inward movement of strips is accurately and precisely stopped when the limiting nuts 111 abut against the abutment surfaces 109 of the stopping plates 107 as has been hereinbefore described. In this manner the amount of actual overlap can be controlled so that an acceptable weld will result and the apparatus is adapted for use with various thicknesses of metal strips.

When the leading and trailing strip ends have reached their overlapped position the energized pivot cylinder 97 is deenergized thereby bringing the ends of the strips into right frictional contact. The operator may now adjust the transverse positioning of the overlapped strips by properly manipulating manual valves, not shown, controlling the flow of fluid to the cross slide cylinders 90 to cross align the strip ends. Since this last mentioned operation takes place after the ends of the strips have been overlapped they can be very accurately cross aligned as is readily apparent.

The overlapped strip sections are now ready to be welded by the welder assembly 22. Fluid is first supplied to the lower cylinder 126 to move the lower electrode 123 into position and then to the upper cylinder 126 to move the upper electrode 123 into position. The motor 133 is next energized to drive the welder assembly across the overlap at a speed determined in part by the thickness of the strips to be welded. When the electrodes 123 pass onto the strip sections suitable control circuitry, not shown, is energized, to supply welding current to these members thereby causing heating and fusing of the strips. Pressure is continually applied to the electrodes so that the thickness of the welded seam is less than the aggregate thickness of the unwelded strips. As the welding electrodes reach the far side of the welded strips the welding current is stopped and the electrodes are retracted as fluid is supplied to the opposite ends of cylinders 126. At the same time the upper clamping members 80 are raised by clamping cylinders 77 so that the welded strips can immediately be started thru the welder to other processing equipment.

The welder assembly 22 is then returned to the far side of the apparatus by means of motor 133. The clamp slide cylinders 85 are supplied with fluid in such a manner that the entire clamping mechanisms are opened horizontally and moved to their original position. The upper shear carriage and carrier can then be operated to bring the upper shears down in preparation for another weld.

Conclusion

It should be apparent that the above described operational cycle of the narrow lap seam welder of the present invention is one of utmost utility in that the same may be carried out in a fast and expedient manner. One of the most important features of the apparatus disclosed herein is its versatility in properly preparing and positioning the ends of metal strips for welding. It is noted that the strip ends may be very accurately moved in vertical, horizontal, and/or transverse directions to effect the proper overlap and positioning. In addition, there is provided means for adjustably limiting the amount of overlap of the ends of the strips so that the apparatus may be employed with different thicknesses of strips.

The narrow lap seam welder of the present invention embodies certain improved mechanical features, such as the use of locking plates, the use of raked shear blades and the operating means therefore, and the construction of the clamping and overlapping assemblies. All of these contribute to an improved narrow lap seam welder well adapted for utilization in continuous process lines and the like.

In accordance with the provisions of the patent statutes, I have explained the principle and operation of my invention and have illustrated and described what I consider to be the best embodiment thereof. However, it should be understood that my invention may be practiced otherwise than as specifically illustrated and described and that therefore reference should be had to the following appended claims in determining the scope of the invention.

I claim:

1. In a welder of the type wherein adjacent ends of strips to be welded are positioned and are traversed by welding means; the combination of a housing having an opening therein for the reception of said welding means, vertically movable upper and lower shear carrier members slidably received in said housing above and below the path of strip travel, a vertically movable upper shear carriage slidably received in said opening above the path of strip travel said upper shear carrier member being carried by said upper shear carriage, linkage means interconnecting said upper shear carriage and said upper shear carrier member, actuator means for vertically moving said upper shear carriage and said lower shear carrier member toward each other and said path of strip travel, and power means for actuating said linkage means whereby said upper shear carrier member may be moved vertically independently of said upper shear carriage.

2. Apparatus according to claim 1 further characterized in that said upper shear carrier member has a downwardly opening recess therein, a vertically movable gauge bar mounted from said upper shear carrier, and second power means for vertically moving said gauge bar into said recess.

3. Apparatus according to claim 2 further characterized in that said second power means comprises fluid cylinders mounted on said upper shear carrier member, and the piston rods of said fluid cylinders being connected to said gauge bar.

4. In a welder of the type wherein adjacent ends of strips to be welded are positioned and are traversed by welding means; the combination of a housing having an opening therein for the reception of said welding means, a carriage member slidably received for vertical movement in said housing on one side of the path of strip travel, actuator means mounted on said housing for moving said carriage member, a shear carrier slidably received for vertical movement in said housing, said shear carrier being mounted from said carriage member, linkage means interconnecting said shear carrier and said carriage member, shear blades attached to said shear carrier, power means for actuating said linkage means whereby said carrier may be moved independently of said carriage member, and shear blades disposed on the other side of the path of strip travel adapted to cooperate with said shear blades attached to said shear carrier.

5. Apparatus according to claim 4 further comprising gauging means movably mounted from said shear carrier, and power means to move said gauging means vertically independently of the movement of said carrier and said carriage.

6. Apparatus according to claim 5 further characterized in that said shear carrier has a downwardly facing recess therein, said power means comprising fluid cylinders mounted on said shear carrier with the piston rods thereof interconnected with said gauging means, and the arrangement being such that said gauging means may be retracted into said recess.

7. Apparatus according to claim 4 further characterized in that said linkage means comprises a pair of toggle linkages interconnecting said shear carrier and said carriage member, said power means comprising a fluid cylinder mounted on said carriage member, and an operating lever interconnecting said fluid cylinder and said toggle linkages whereby upon appropriate actuation of said fluid cylinder said toggle linkages are moved to move said shear carrier.

8. In a welder of the type wherein adjacent ends of strips to be welded are positioned and are traversed by welding means; the combination of a housing having an opening therein for the reception of said welding means, upper and lower carriage members slidably received in said housing above and below the path of strip travel, a plurality of vertically extending members attached to each of said carriage members, actuating means mounted on said housing for raising and lowering said carriage members, a plurality of apertures in said housing for the passage of said vertically extending members when said carriages are retracted, and means to block said apertures when said carriages are in the extended position whereby shock forces are relieved from said actuating means.

9. Apparatus according to claim 8 further characterized in that each of said means to block comprises a plate slidably mounted on said housing, and a fluid cylinder operative to move each of said blocking plates into and from obstructing relation with respect to said plurality of apertures.

10. In a seam welder of the type wherein adjacent ends of strips are adapted to be traversed by welding means; the combination of a housing having an opening therein for the reception of said welding means, upper and lower carriage members received in said housing above and below the path of strip travel, actuating means for each of said carriage members for raising and lowering the same, vertically extending members attached to each of said carriage members, openings in said housing for the passage of said vertically extending members when said carriages are retracted, and retractable means operative to block said openings when said carriages are in extended position.

11. Apparatus according to claim 10 further characterized in that said retractable means comprises a slidable blocking plate for each of said carriages mounted by channels attached to said housing, means for moving each of said blocking plates, and each of said blocking plates forming an abutment surface for the ends of the vertically extending members associated with one of said carriages when the same is in an extended position.

12. In a welder of the type wherein adjacent ends of strips to be welded are positioned and are traversed by welding means; the combination of a housing having an opening therein for the reception of said welding means, shearing means adapted to be interposed in said opening in obstructing relation with the path of strip travel, strip clamping means on opposite sides of said opening, means to elevate at least one of said clamping means above the path of strip travel, means to horizontally move said clamping means toward each other, means to adjustably limit said horizontal movement, and means to transversely move at least one of said clamping means and to effect cross alignment of the strip ends.

13. Apparatus according to claim 12 further characterized in that each of said clamping means comprises a platen and a vertically movable clamping member, means to move said vertically movable clamping member into clamping relation with said platen, said means to horizontally move comprising a fluid cylinder mounted on an intermediate member and having its piston rod attached to said platen, a pair of rods extending from said platen carrying limiting nuts on the ends thereof, and a stopping plate carried by said intermediate member whereby horizontal movement of said clamping member is stopped when said limiting nuts abut said stopping plate.

14. Apparatus according to claim 13 further characterized in that said stopping plate has elongated apertures therein for the reception of said pair of rods, a plurality of abutment surfaces on said stopping plate of different thicknesses adapted to limit the movement of said limiting nuts, said stopping plate being adapted for transverse movement, and detent means to retain said stopping plate in any one of a plurality of transverse positions.

15. A clamping assembly for a seam welder comprising a strip supporting platen, an upper clamping member, means to vertically move said upper clamping member into clamping relation with said platen, said platen being mounted for horizontal sliding movement on an intermediate member, a first fluid cylinder mounted from said intermediate member and having its piston connected to said platen, said intermediate member being mounted for transverse sliding movement on a block, a second fluid cylinder attached to said block and having a driving connection with said intermediate member, a frame, a third fluid cylinder mounted on said frame and having its piston rod connected with said block, and said block being pivotally supported from said frame whereby upon actuation of said third cylinder said platen and clamping member are pivoted out of the normal path of strip travel.

16. Apparatus according to claim 15 further characterized in that said means to vertically move said clamping member into clamping relation with said platen comprises a pair of brackets mounted on opposite sides of said platen, a fluid cylinder supported by each of said brackets, and said fluid cylinders being operatively connected with said clamping member.

17. Apparatus according to claim 15 further characterized by means to adjustably limit the horizontal movement of said platen and clamping member, said means comprising a pair of spaced rods extending horizontally from said platen, limiting nuts on the ends of said rods, a stopping plate having elongated apertures therein for the passage of said rods, said stopping plate being carried and supported from said intermediate member, said stopping plate comprising a plurality of abutment surfaces of different thicknesses, and said stopping plate being adapted for limited transverse movement, the arrangement being such that the horizontal movement of said platen and clamping member is arrested when said limiting nuts abut said abutment surfaces.

18. A clamping assembly for seam welders comprising a strip supporting platen, an upper clamping member, means to vertically move said upper clamping member into clamping relation with said platen, means to elevate said platen above the normal path of strip travel, means to horizontally move said platen, means to adjustably limit the horizontal movement of said platen, said last mentioned means comprising members attached to and extending horizontally from said platen, limiting means on the rear ends of said members, a support fixed relative to the horizontal movement of said platen, a stopping plate mounted for transverse movement on said support, said stopping plate having a pair of elongated apertures therein for the passage of said members attached, and said stopping plate having a plurality of stepped abutment surfaces whereby upon proper positioning of said stopping plate the horizontal movement of said platen is correctly limited when said limiting means engage a portion of said abutment surfaces.

19. Apparatus according to claim 18 further characterized in that clamping assembly further comprises releasable detent means for retaining said stopping plate in desired transverse positions.

20. In a welder wherein the adjacent ends of strips to be welded are positioned and are traversed by welding means; the combination of a housing having an opening therein for the reception of said welding means, a carriage member slidably received in said housing for vertical movement on one side of the path of strip travel, actuator means mounted on said housing for raising and lowering said carriage member, a shear carrier slidably received for vertical movement in said housing, said shear carrier being mounted from said carriage member, linkage means interconnecting said shear carrier and said carriage member, shearing means attached to said shear carrier, and power means for actuating said linkage means whereby said carrier may be moved vertically independently of said carriage member.

21. Apparatus according to claim 20 further characterized in that said linkage means comprises toggle linkages interconnecting said shear carrier and said carriage member, said power means being mounted from said carriage member, and an operating rod interconnecting said power means with said toggle linkages whereby upon appropriate actuation of said power means said toggle linkages are moved to move said shear carrier.

22. In a welder wherein adjacent strip ends are positioned and traversed by welding means; the combination of a housing having an opening therein for the reception of said welding means, a carriage member received in said housing for vertical movement toward and away from the path of strip travel, a shear carrier received in said housing for vertical movement toward and away from said path of strip travel, linkage means interconnecting said carriage member and said shear carrier, power means for actuating said linkage means whereby said shear carrier may be raised and lowered independently of said carriage member, gauge bar means mounted in said housing for movement toward and away from said path of strip travel, second linkage means interconnecting said gauge bar means and said shear carrier, and means for actuating said second linkage means whereby said gauge bar means may be raised and lowered independently of said shear carrier and said carriage member.

23. In a welder wherein adjacent ends of strip are positioned and traversed by welding means; the combination of a housing having an opening therein for the reception of said welding means, a vertically movable member slidably received in said opening for vertical movement toward and away from said path of strip travel, actuating means for raising and lowering said member, gauge means received in said opening and adapted for movement toward and away from said path of strip travel said gauge means being mounted from said member, linkage means interconnecting said gauge means and said member, and means for actuating said linkage means for vertically moving said gauge means independently of said member.

24. Apparatus according to claim 23 further characterized in that said member has a downwardly opening recess therein, said means for actuating comprising fluid cylinders mounted on the ends of said member, and said linkage means comprising the piston rods of said fluid cylinders whereby said gauge means may be retracted into said recess.

25. A clamping assembly for seam welders comprising a strip supporting platen, a clamping member, means to move said clamping member into clamping relation with said platen, means to horizontally move said platen, means to adjustably limit the horizontal movement of said platen, said last mentioned means comprising a member attached to and extending from said platen, a support fixed relative to the horizontal movement of said platen, a stopping plate mounted for transverse movement on said support, said stopping plate having an opening therein for the passage of said member attached, and said stopping plate having a plurality of stepped abutment surfaces whereby upon proper positioning of said support the horizontal movement of said platen is correctly limited when said member attached engages a portion of said abutment surfaces.

References Cited in the file of this patent

UNITED STATES PATENTS

| 1,226,639 | Cary | May 22, 1917 |
| 2,078,365 | Biggert et al. | Apr. 27, 1937 |
| 2,143,969 | Biggert | Jan. 17, 1939 |
| 2,362,388 | MacChesney et al. | Nov. 7, 1944 |
| 2,369,830 | Johnson et al. | Feb. 20, 1945 |
| 2,398,840 | Morin | Apr. 23, 1946 |
| 2,412,648 | Rendel | Dec. 17, 1946 |
| 2,459,625 | Copp | Jan. 18, 1949 |
| 2,623,589 | Price et al. | Dec. 30, 1952 |
| 2,663,784 | Iversen | Dec. 22, 1953 |
| 2,689,610 | Myers | Sept. 21, 1954 |